(12) United States Patent
Kim et al.

(10) Patent No.: US 8,049,953 B2
(45) Date of Patent: Nov. 1, 2011

(54) MICROCAPSULE PATTERNING METHOD

(75) Inventors: Chul Am Kim, Seoul (KR); Seung Youl Kang, Daejeon (KR); Hey Jin Myoung, Daejeon (KR); Kyung Soo Suh, Daejeon (KR); Seong Deok Ahn, Daejeon (KR); Gi Heon Kim, Daejeon (KR); In Kyu You, Daejeon (KR); Ji Young Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 87 days.

(21) Appl. No.: 12/377,563

(22) PCT Filed: Sep. 18, 2007

(86) PCT No.: PCT/KR2007/004517
§ 371 (c)(1),
(2), (4) Date: Feb. 13, 2009

(87) PCT Pub. No.: WO2008/038928
PCT Pub. Date: Apr. 3, 2008

(65) Prior Publication Data
US 2010/0225994 A1    Sep. 9, 2010

(30) Foreign Application Priority Data
Sep. 27, 2006  (KR) .................. 10-2006-0094249

(51) Int. Cl.
*G02B 26/00* (2006.01)
*G03G 17/04* (2006.01)

(52) U.S. Cl. .......................... 359/296; 430/32

(58) Field of Classification Search ............. 359/296; 345/107; 204/600; 430/32
See application file for complete search history.

(56) References Cited

U.S. PATENT DOCUMENTS

| 6,377,387 | B1 | 4/2002 | Duthaler et al. |
| 6,422,687 | B1 | 7/2002 | Jacobson |
| 6,542,284 | B2 * | 4/2003 | Ogawa ............... 359/296 |
| 2003/0137717 | A1 * | 7/2003 | Albert et al. .......... 359/296 |

FOREIGN PATENT DOCUMENTS

| JP | 2000-035769 | | 2/2000 |
| JP | 2000035769 A | * | 2/2000 |
| JP | 2002-189234 A | | 7/2002 |
| JP | 2002-526812 A | | 8/2002 |
| KR | 10-20030069339 | | 8/2003 |
| KR | 20040018186 | | 3/2004 |
| KR | 10-20060046234 | | 5/2006 |
| WO | WO-00/20922 A1 | | 4/2000 |

* cited by examiner

*Primary Examiner* — William C Choi
(74) *Attorney, Agent, or Firm* — Rabin & Berdo, P.C.

(57) ABSTRACT

Provided is a microcapsule patterning method for patterning electrophoretic microcapsules on a substrate, the method including the steps of: preparing a microcapsule slurry in which microcapsules and a water-soluble binder are mixed; putting the microcapsule slurry into a liquid ejector having injection and ejection ports formed therein; and applying the microcapsule slurry contained in the liquid ejector onto the substrate so as to pattern pixels using the microcapsules. Accordingly, specific patterns are formed without physical and chemical damage to the microcapsules. Therefore, the patterns can be used as pixels of flat panel displays. Further, through the patterning, it is possible to implement a color display device which does not exhibit performance degradation.

9 Claims, 3 Drawing Sheets

[Fig. 1]
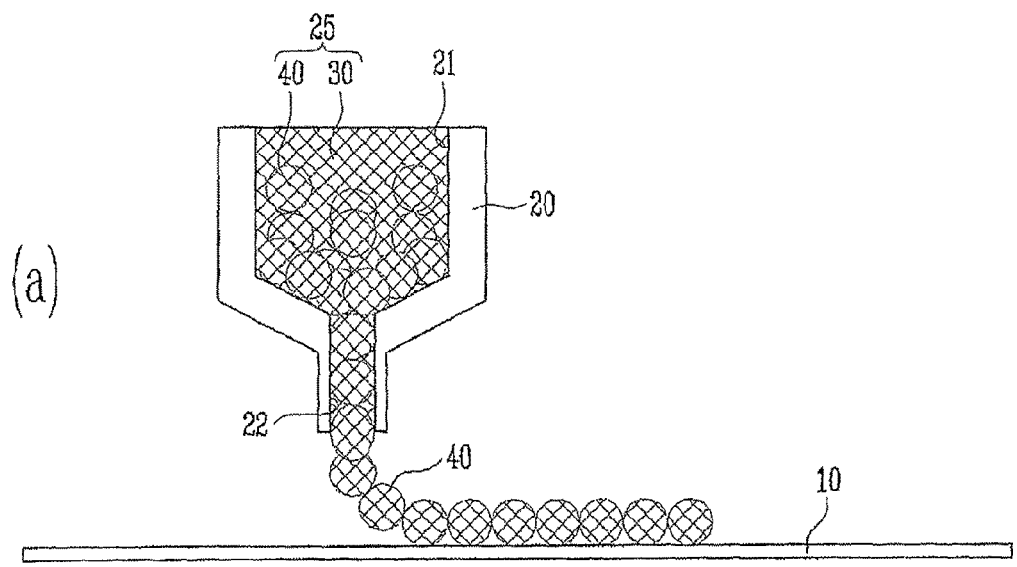
(a)
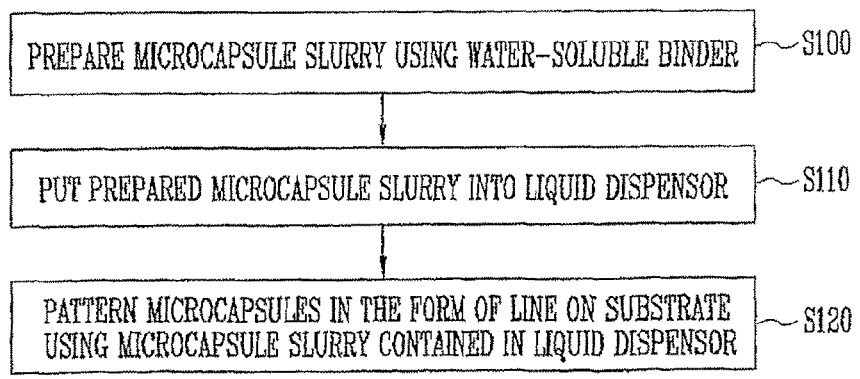
(b)

[Fig 2]
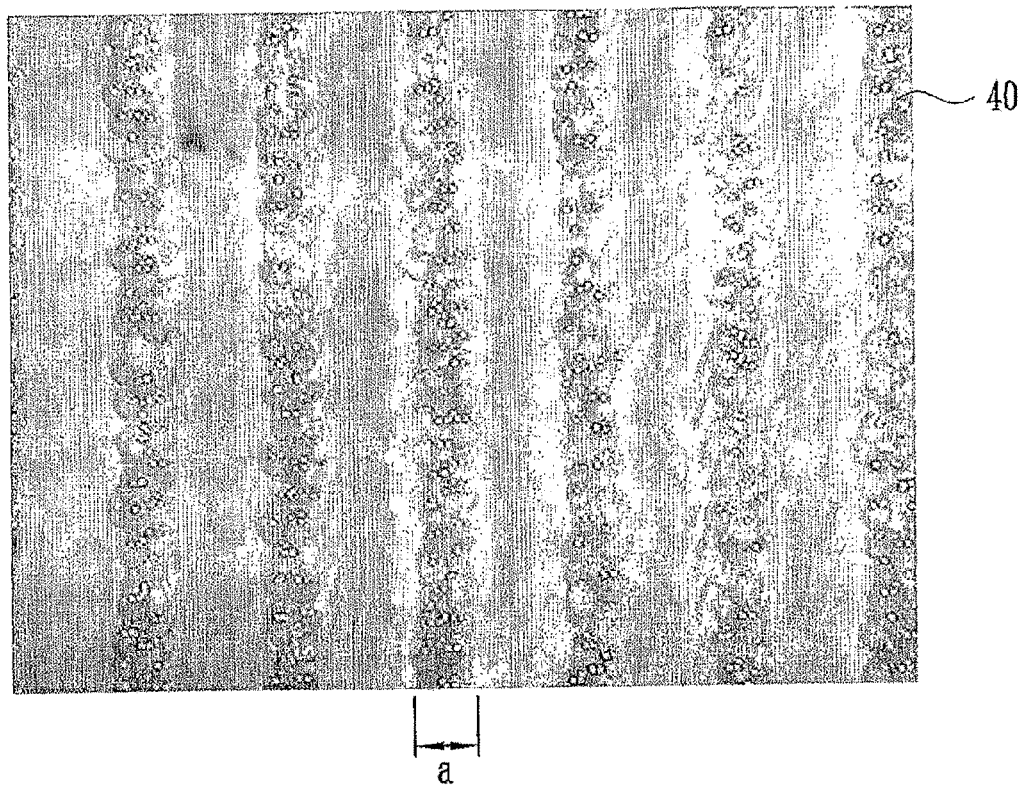

[Fig 3]
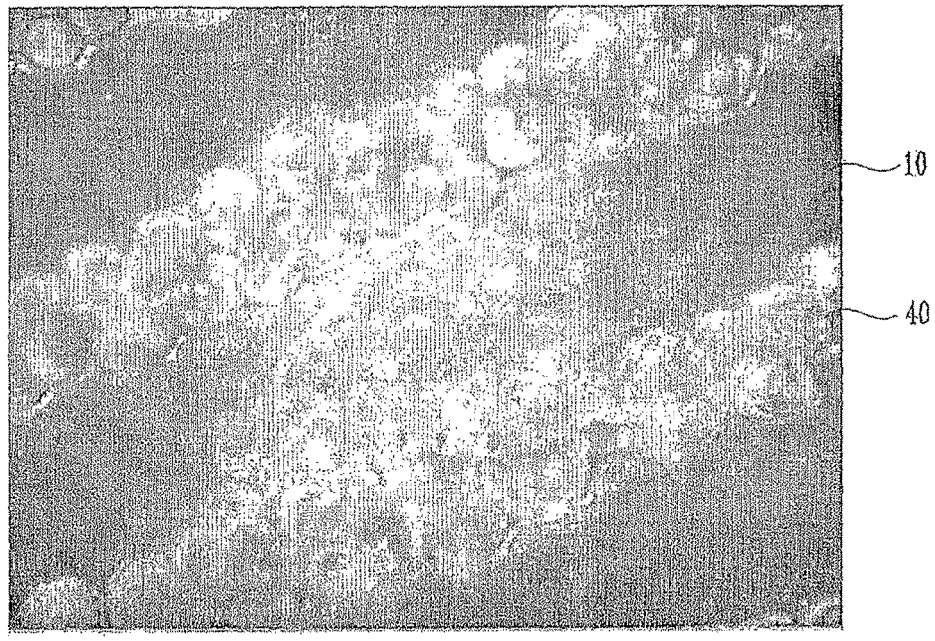
(a)
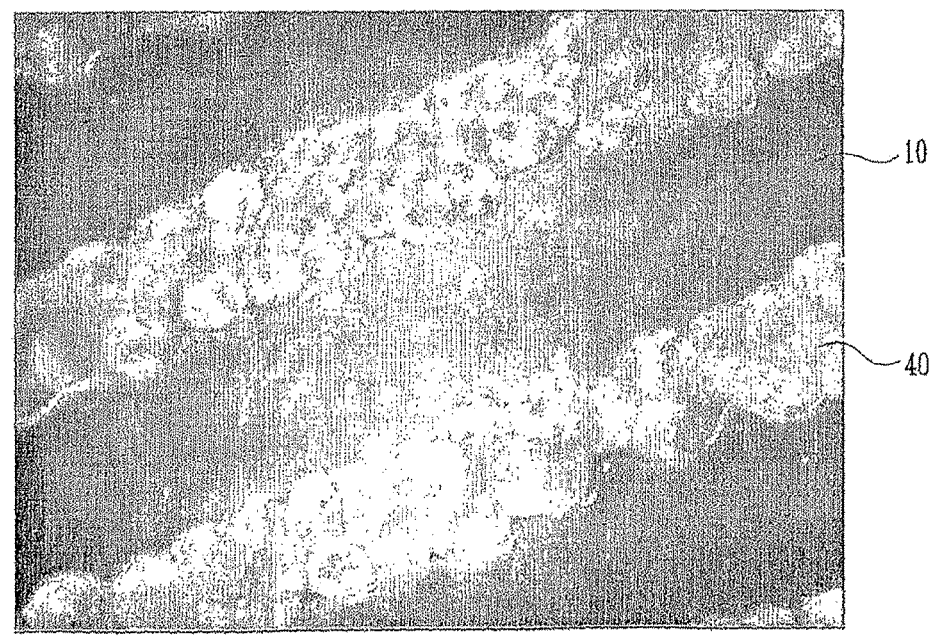
(b)

MICROCAPSULE PATTERNING METHOD

TECHNICAL FIELD

The present invention relates to a microcapsule patterning method, and more specifically, to a microcapsule patterning method in which color microcapsules that can be applied to an electrophoretic display are prepared and used for implementing color e-paper.

This work was supported by the IT R&D program of MIC (Ministry of Information and Communication)/IITA (Institute for Information Technology Advancement) [2005-S-070-03, Flexible Display] in Korea.

BACKGROUND ART

Conventional microcapsules have been developed in the USA. There is no standard for the size of microcapsules, and the microcapsules are manufactured by injecting liquid, solid or gas molecules into minute capsules (cells) and then sealing the capsules. Depending on manufacturing methods, the microcapsules may have a diameter of several nm to mm. Further, the microcapsules can be applied to various fields, such as medicine, food, energy, agriculture and so on.

Recently, the microcapsules have also been applied to flat panel displays. In particular, a microcapsule-type electrophoretic display is considered to be a leading technical field for implementing e-paper. In the microcapsule-type electrophoretic display, several million white and black particles are injected into a microcapsule having a size corresponding to the diameter of a human hair, and microcapsules having the white-and-black particle suspensions injected therein are injected between a transparent electrode and a driving electrode.

When a negative electric field is applied to the electrophoretic display constructed in such a manner, white particles, among the suspended white-and-black particles injected into the microcapsule, are charged with positive electricity to move to the upper portion of the microcapsule. That is, the white particles crowd to one direction of the microcapsule. As such, when the white particles move to the upper portion of the microcapsule, this portion represents a 'white color' on the e-paper. Simultaneously, black particles crowd to the opposite side of the microcapsule such that a 'black color' is not represented on the surface of the microcapsule. On the contrary, in order to display a block character or picture, the opposite electric field is applied. When the opposite electric field is applied, the black particles come to the surface of the microcapsule, and the white particles are hidden from the surface.

In the above-described microcapsule-type electrophoretic display, even when power is turned off, particles do not disappear but remain on the screen. Unlike other displays, a backlight is not needed so that operating voltage is considerably reduced. Further, the contrast between white and black particles is so strong that a clear image can be seen from any angle. However, despite the above-described advantages, only black-and-white e-paper is commonly used, and the utilization range thereof is considerably limited.

To overcome such a disadvantage, attempts are being made to develop color e-paper. A method used for the development of color e-paper is where a color filter is adopted and attached to a display unit of the black-and-white e-paper so as to implement color e-paper through the same method as an LCD display. It is known that the method is being attempted by E-Ink, Inc. Further, a method of directly patterning microcapsules is being attempted. In this method, hydrophile treatment and hydrophobic treatment are performed on an electrode surface by using a hydrophilic binder surrounding microcapsules such that the microcapsules crowd to the hydrophilic surface. Attempts to form desired capsule patterns are being made. Meanwhile, methods of directly depositing microcapsules onto an electrode through electro deposition are also being attempted.

In general, binary-system materials such as microcapsules are applied in a bulk state, without attempting to form patterns in a predetermined shape. This is because inner materials should be protected or the discharge of the inner materials with functionality should be adjusted. However, when pixels are desired to be represented by capsules as in a display, respective color pixels should be arranged. When such pixels are represented by microcapsules, the microcapsules may be directly patterned and implemented as pixels. Alternately, after the microcapsules are applied in a bulk state, a color filter may then be attached. When the color filter is attached to the microcapsule layer, the electrophoretic microcapsule-type e-paper is a reflective display which does not have a backlight, unlike an LCD display. In the microcapsule-type electrophoretic e-paper, while incident light is reflected so as to pass through a microcapsule layer, a loss occurs. After that, the light passes through the color filter. Therefore, it is difficult to obtain clear color.

DISCLOSURE OF INVENTION

Technical Problem

In order to solve the foregoing and/or other problems, it is an objective of the present invention to provide a microcapsule patterning method in which microcapsule pixels are directly patterned onto a substrate.

It is another object of the present invention to provide a microcapsule patterning method in which microcapsules containing various color particle suspensions are mixed and patterned on a substrate, in order to manufacture micro pattern lines by directly attaching the microcapsules to the substrate under a normal temperature condition.

Technical Solution

In one aspect, the invention is directed to a microcapsule patterning method for patterning electrophoretic microcapsules on a substrate, the method including the steps of: preparing a microcapsule slurry in which microcapsules and a water-soluble binder are mixed; putting the microcapsule slurry into a liquid dispenser having injection and ejection ports formed therein; and applying the microcapsule slurry contained in the liquid dispenser onto the substrate so as to pattern pixels using the microcapsules.

The weight percentage of the water-soluble binder mixed in the microcapsule slurry with respect to the microcapsules may range from 5 to 20 wt %. The water-soluble binder may include at least one of water-soluble urethane, water-soluble acrylic resin, water soluble Ethylene-Vinyl Acetate copolymer (EVA), acrylic resin, and polyvinyl alcohol.

In the step of patterning pixels, the microcapsules may be patterned in the form of a line with a predetermined width. Further, the microcapsules patterned in the form of a line may have a width of 100 to 500 μm.

Advantageous Effects

According to the present invention as described above, the microcapsule slurry is prepared, and the microcapsules are patterned by the liquid dispenser such that specific patterns are formed without physical and chemical damage to the microcapsules. Therefore, the patterns can be used as pixels of e-paper which is a kind of flat panel display. Further, through the patterning it is possible to implement a color display device which does not exhibit performance degradation.

BRIEF DESCRIPTION OF THE DRAWINGS

FIG. 1A is a schematic view showing a state where microcapsules are dropped using a microcapsule slurry prepared according to the present invention, and FIG. 1B is a flow chart showing a microcapsule patterning process.

FIG. 2 is a photograph showing microcapsule lines patterned according to the present invention.

FIGS. 3A and 3B are photographs showing results in which an electrophoretic characteristic is measured after a transparent electrode substrate is covered with microcapsule patterns manufactured according to the present invention.

DESCRIPTION OF MAJOR SYMBOLS IN THE ABOVE FIGURES

10: Substrate
20: Liquid dispenser
21: Injection port
22: Ejection port
25: Microcapsule slurry
30: Water-soluble binder
40: Microcapsule

MODE FOR THE INVENTION

Hereinafter, exemplary embodiments of the present invention will be described in detail with reference to the accompanying drawings.

FIG. 1A is a schematic view showing a state where microcapsules are dropped using a microcapsule slurry prepared according to the present invention, and FIG. 1B is a flow chart showing a microcapsule patterning process. FIG. 2 is a photograph showing microcapsule lines patterned according to the present invention.

Referring to FIGS. 1A and 1B, a microcapsule slurry 25 is prepared so as to pattern microcapsules on a substrate 10 (step S100). First, microcapsules 40 for electrophoretic display are prepared, which are used for the microcapsule slurry 25.

The prepared microcapsules 40 are binary-system materials including liquid and solid particles (for example, color or black-and-white particles) and are protected by protective layers (for example, polymer layers with a thickness of 0.1-0.3 $\mu$m) which surround the particles. The microcapsules 40 are dehydrated and are then mixed with a water-soluble binder 30, thereby preparing the microcapsule slurry 25. At this time, the microcapsule slurry 25 is the most effective when 5-20 wt % water-soluble binder with respect to the microcapsules 40 is added. Therefore, the weight percentage of the water-soluble binder 30 is properly selected from the range of 5 to 20 wt %. As for the water-soluble binder 30, at least one of water-soluble urethane, water-soluble acrylic resin, water-soluble Ethylene-Vinyl Acetate copolymer (EVA), acrylic resin, and polyvinyl alcohol can be used. When the microcapsules 40 and the water-soluble binder 30 are mixed, the viscosity of the water-soluble binder 30, a degree of hydrophile property, hardening temperature, time and so on should be adjusted. Depending on the viscosity of the mixed slurry, the viscosity of the water-soluble binder 30 has an effect upon the pressure of a liquid ejector 20, the inner diameter of a nozzle and so on. Preferably, the degree of hydrophile property of the water-soluble binder 30 is proper when less than 7 wt % of an organic solvent is contained in the binder. In this case, application is easily performed on a conductive substrate.

In a first exemplary embodiment of the present invention, 10 wt % of a urethane binder (made by Neoresin, Inc., R-961), which serves as the water-soluble binder 30, with respect to the microcapsules is uniformly mixed, thereby preparing the microcapsule slurry 25. In a second exemplary embodiment of the present invention, 10 wt % of a urethane binder (made by Neoresin, Inc., R-966), which serves as the water-soluble binder 30, and 10 wt % polyvinyl alcohol (10%) with respect to the microcapsules 40 are uniformly mixed, thereby preparing the microcapsule slurry 25.

In the next step S110, the microcapsule slurry 25 prepared using the water-soluble binder 30 and the microcapsules 40 is put into the liquid dispenser 20. Referring to FIG. 1A, the liquid dispenser 20 formed in a funnel shape has an injection port 21 formed in an upper portion thereof and a nozzle of an ejection port 22 formed in a lower portion thereof. The microcapsule slurry 25 is injected through the injection port 21 and is ejected from the nozzle of an ejection port 22.

After the mixed microcapsule slurry 25 is put into the liquid dispenser 20, the microcapsule slurry 25 is ejected onto a transparent electrode substrate 10 so as to be patterned (step S120). The substrate 10 may be formed of a glass substrate or a plastic substrate which has conductivity and transparency. Referring to FIG. 2, the microcapsule slurry 25 is ejected onto the substrate 10 by the liquid dispenser 20 such that the microcapsules are repeatedly patterned at predetermined intervals in the form of a line. At this time, when the microcapsules are patterned, the line width A of patterns is set in the range of 100 to 500 $\mu$m. Therefore, the line width A can be properly selected from the range of 100 to 500 $\mu$m by adjusting the nozzle of the liquid dispenser 20, in accordance with a width desired by a user. A preferable line width ranges from 100 to 300 $\mu$m.

Meanwhile, a distance between the respective patterns is set to be equal to or two or three times larger than the width of the applied pattern such that different colors of capsules can be applied between the patterns. Then, although the substrate 10 is heat-treated after the microcapsule lines are repeatedly formed on the substrate 10 by the liquid dispenser 20, the microcapsule lines are not destroyed, and the shape thereof can be maintained. Therefore, the microcapsule line patterns formed in such a manner can be used in pixels of electrophoretic display.

As described above, the color microcapsules are prepared and patterned, and can be applied to an electrophoretic display and can be used in pixels which are essentially required when color e-paper is implemented. In the present invention, since the microcapsules are patterned by the liquid dispenser, specific patterns can be formed while the patterned microcapsule lines are not damaged physically and chemically.

FIGS. 3A and 3B are photographs showing results in which an electrophoretic characteristic is measured after the transparent electrode substrate is covered with the microcapsule patterns manufactured according to the present invention.

FIG. 3A shows a case where a positive voltage is applied onto the substrate 10 having the microcapsule lines patterned thereon. In this case, colorful particles (for example, red particles) move toward a visual field. FIG. 3A shows a case where a negative voltage is applied onto the substrate 10 having the microcapsule lines patterned thereon. In this case, white particles move toward a visual field such that the surfaces of the capsules look white. Specifically, FIGS. 3A and 3B are photographs showing cases where voltages of +10V and −10V are respectively applied. As such, although a predetermined voltage is applied onto the substrate 10 after the microcapsule line patterns are formed by the microcapsule line patterning technique using the liquid ejector 20, the microcapsules are not damaged at all.

In order to implement the above-described effect, the first exemplary embodiment, in which 10 wt % of a urethane binder (made by Neoresin, Inc., R-961) serving as the water-soluble binder with respect to the microcapsules is uniformly mixed, and the second exemplary embodiment, in which 10 wt % of a urethane binder (made by Neoresin, Inc., R-966) serving as the water-soluble binder and 10 wt % polyvinyl alcohol (10%) with respect to the microcapsules are uniformly mixed, can be used.

Exemplary embodiments of the present invention have been disclosed herein and, although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims.

The invention claimed is:

1. A microcapsule patterning method for patterning electrophoretic microcapsules on a substrate, the method comprising the steps of:
preparing a microcapsule slurry in which microcapsules and a water-soluble binder are mixed;
putting the microcapsule slurry into a liquid dispenser having injection and ejection ports formed therein; and
forming microcapsule lines by applying the microcapsule slurry contained in the liquid dispenser onto the substrate so as to pattern pixels using the microcapsules,
wherein the liquid dispenser applies the microcapsule slurry by using pressure,
wherein a distance between the microcapsule lines is set to be equal to or two or three times larger than a width of the microcapsule line such that microcapsule lines with different colors of capsules are allowed to be applied between preformed microcapsule lines.

2. The microcapsule patterning method according to claim 1, wherein in the step of preparing the microcapsule slurry, the weight percentage of the water-soluble binder mixed in the microcapsule slurry with respect to the microcapsules ranges from 5 to 20 wt %.

3. The microcapsule patterning method according to claim 2, wherein the water-soluble binder comprises at least one of water-soluble urethane, water-soluble acrylic resin, water-soluble Ethylene-Vinyl Acetate copolymer (EVA), acrylic resin, and polyvinyl alcohol.

4. The microcapsule patterning method according to claim 1, wherein in the step of forming microcapsule lines, each microcapsule line is formed by patterning the microcapsules in the form of a line with a predetermined width.

5. The microcapsule patterning method according to claim 4, wherein the microcapsules patterned in the form of a line have a width of 100 to 500 μm.

6. A microcapsule patterning method for patterning electrophoretic microcapsules on a substrate, the method comprising the steps of:
preparing a microcapsule slurry in which microcapsules and a water-soluble binder are mixed;
putting the microcapsule slurry into a liquid dispenser having an injection port, an ejection port and an inclined inner surface adjacent to the injection port, the injection port being wider than the ejection port, wherein a plurality of the microcapsules are disposed on the inclined inner surface of the liquid dispenser, and two adjacent ones of the microcapsules on the inclined inner surface come in contact with each other; and
forming microcapsule lines by applying the microcapsule slurry contained in the liquid dispenser onto the substrate so as to pattern pixels using the microcapsules,
wherein a distance between the microcapsule lines is set to be equal to or two or three times larger than a width of the microcapsule line such that microcapsule lines with different colors of capsules are allowed to be applied between preformed microcapsule lines.

7. The microcapsule patterning method according to claim 6, wherein each microcapsule line is formed by patterning the microcapsules in the form of a line with a width of 100 to 500 μm, and two or more microcapsules are disposed within the width of the line.

8. A microcapsule patterning method for patterning electrophoretic microcapsules on a substrate, the method comprising the steps of:
preparing a microcapsule slurry in which microcapsules and a water-soluble binder are mixed, the water-soluble binder being selected from the group consisting of water-soluble urethane, water-soluble Ethylene-Vinyl Acetate copolymer (EVA) and polyvinyl alcohol;
putting the microcapsule slurry into a liquid dispenser having injection and ejection ports formed therein; and
forming microcapsule lines by applying the microcapsule slurry contained in the liquid dispenser onto the substrate so as to pattern pixels using the microcapsules,
wherein a distance between the microcapsule lines is set to be equal to or two or three times larger than a width of the microcapsule line such that microcapsule lines with different colors of capsules are allowed to be applied between preformed microcapsule lines.

9. The microcapsule patterning method according to claim 8, wherein each microcapsule line is formed by patterning the microcapsules in the form of a line with a width of 100 to 500 μm, and two or more microcapsules are disposed within the width of the line.

* * * * *